(12) United States Patent
Pussinen

(10) Patent No.: US 6,532,363 B1
(45) Date of Patent: Mar. 11, 2003

(54) METHOD AND ARRANGEMENT FOR TRANSFERRING SPECIAL CELL INFORMATION IN A CELLULAR SYSTEM

(75) Inventor: Arto Pussinen, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/508,212

(22) PCT Filed: Sep. 10, 1998

(86) PCT No.: PCT/FI98/00711

§ 371 (c)(1),
(2), (4) Date: Mar. 8, 2000

(87) PCT Pub. No.: WO99/13674

PCT Pub. Date: Mar. 18, 1999

(30) Foreign Application Priority Data

Sep. 10, 1997 (FI) .................................................. 973650

(51) Int. Cl.⁷ ............................................... H04Q 7/20
(52) U.S. Cl. ........................ 455/435; 455/440; 455/443; 455/445
(58) Field of Search ................................ 455/432, 435, 455/436, 440, 443, 445, 446, 448, 485

(56) References Cited

U.S. PATENT DOCUMENTS

| | | | | |
|---|---|---|---|---|
| 5,212,684 A | * | 5/1993 | MacNamee et al. | 370/24 |
| 5,309,500 A | * | 5/1994 | Koma et al. | 379/58 |
| 5,732,349 A | * | 3/1998 | Sanpei et al. | 455/435 |
| 5,854,981 A | * | 12/1998 | Wallstedt et al. | 455/439 |

FOREIGN PATENT DOCUMENTS

| | | |
|---|---|---|
| DE | 4424558 A1 | 1/1996 |
| FI | 960939 | 2/1996 |
| FI | 952965 | 12/1996 |
| WO | WO 93/16549 | 8/1993 |
| WO | WO/95/24809 | 9/1995 |

* cited by examiner

*Primary Examiner*—Nay Maung
*Assistant Examiner*—Tanmay Lele
(74) *Attorney, Agent, or Firm*—Perman & Green, LLP

(57) ABSTRACT

The invention relates to a method for transferring special cell information in a communications system and a cellular system and mobile station realizing the method. The invention can be advantageously applied to cellular systems specifying cell-specific services for users, such as cell-dependent charging. An idea of the invention is that special cell identities are transferred from a mobile station to a base station system in coded form (521, 522) in such a manner that the transfer of special cell identity information uses fewer bits than what would be needed for the transfer of special cell identities as such. Cell identities are advantageously chosen such that the cell identities of a single area can be coded using a small number of bits. In accordance with the above-mentioned principle according to the invention the transfer can be carried out advantageously in such a manner that the first special cell identity in the special cell list is transferred as such (501) whereafter it is transferred transfer codes (522) which are differences (521) of two consecutive special cell identities in the special cell list. The special cell identities in the special cell list are advantageously arranged in the order of magnitude in the special cell list. Using the solution according to the invention it is possible to transfer the special cell information on the radio path by means of a single short message so that the transfer of special cell information can be carried out quickly without using a lot of the radio path's capacity in connection with call setup and handover.

14 Claims, 6 Drawing Sheets

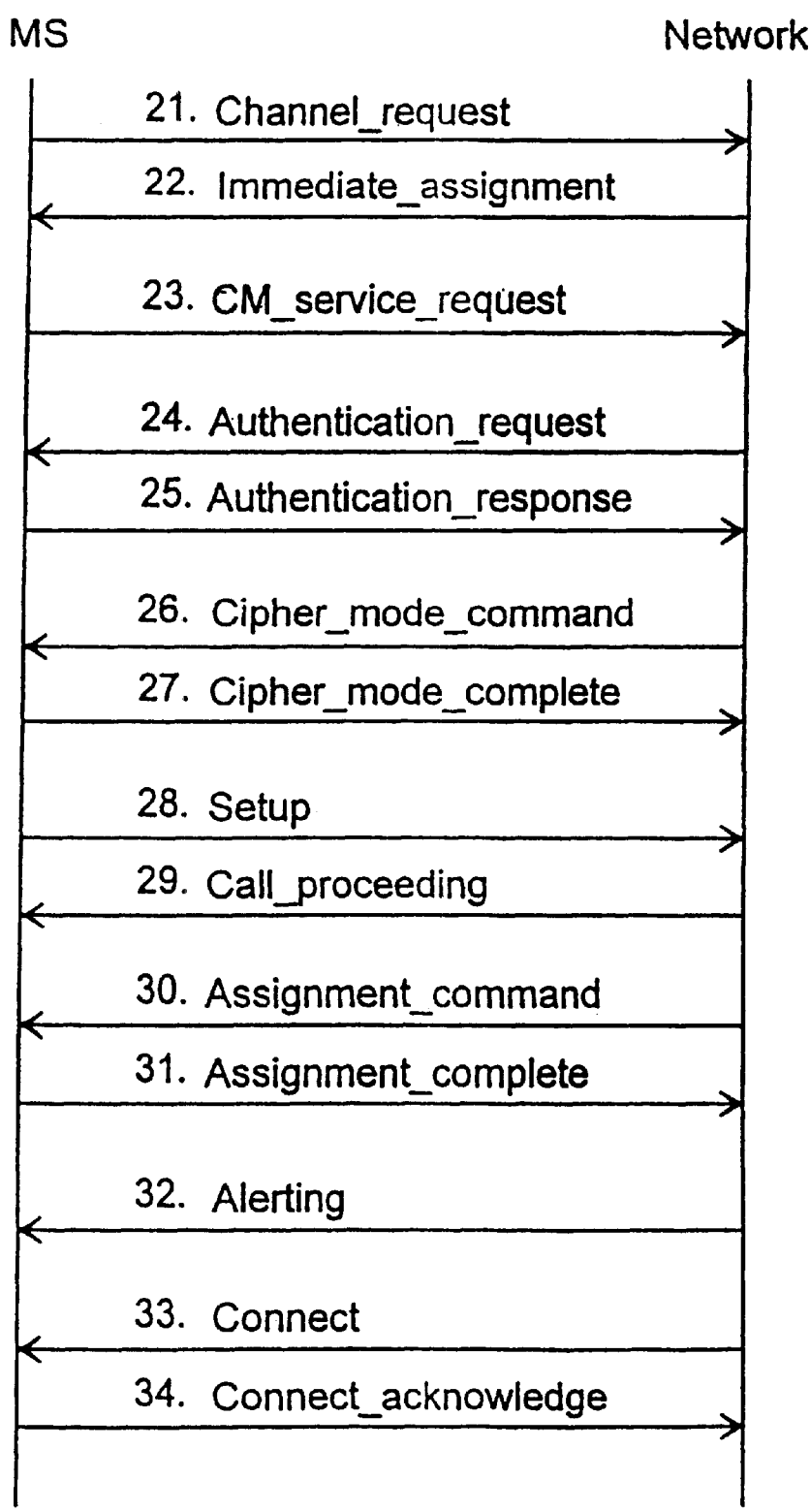

METHOD AND ARRANGEMENT FOR TRANSFERRING SPECIAL CELL INFORMATION IN A CELLULAR SYSTEM

BACKGROUND OF INVENTION

The invention relates to a method for transferring special cell information in a communications system and to a cellular system and mobile station that realise the method. The invention can be advantageously applied in cellular systems in which users are assigned cell-specific services such as cell-dependent charging. Such cellular systems may be digital cellular systems such as GSM (Global System for Mobile Communications).

First it will be discussed the prior art by disclosing the call setup and handover procedures in GSM. Then it will be described a known arrangement for implementing a cell-specific service as well as problems involved in the solutions described.

In cellular mobile communication systems a mobile station can move freely in the area of the mobile communication network and choose the best base station signal available at a particular moment. Usually all base stations offer substantially the same services to the mobile stations in the network. Some base stations, however, may be specified so as to offer a special service to all mobile stations in the network, e.g. a call charge rate cheaper than the normal rate. The base station informs on its broadcast control channel (BCCH) about such a special service so that the mobile subscribers in the area will know that they are in a special service area of the network and can utilise the service.

FIG. 1 of the attached drawing shows a simplified block diagram of the pan-European GSM. A mobile station MS is connected by radio with a base transceiver station BTS, in the case depicted by FIG. 1 to base transceiver station BTS1. The mobile station MS receives in the standby mode the transmission of a base station it has selected. A base station system BSS comprises a base station controller BSC which controls base transceiver stations BTS. A mobile services switching centre is connected with other mobile services switching centres, a gateway mobile services switching centre GMSC and possibly with an intelligent network IN. Through the gateway mobile services switching centre GMSC the GSM network is connected with other networks, such as a public switched telephone network PSTN, public land mobile network PLMN, integrated services digital network ISDN or with an intelligent network IN. The operation of the whole system is supervised by an operation and maintenance centre OMC.

A mobile station's subscriber data are permanently stored in the system's home location register HLR and temporarily in the visitor location register VLR in the area of which the mobile station is located at a given moment. The visitor location register VLR contains location information for a mobile station MS with the accuracy of a location area LA. The geographical area controlled by the visitor location register is divided into one or more location areas LA within which a mobile station may move freely without registering in the visitor location register. Each location area may have one or more base transceiver stations BTS operating in it.

Base transceiver stations BTS continuously transmit on their broadcast control channels information about them and their surroundings, such as cell identity CI, information about neighbour cells and the location area identity LAI. The location area identity tells a mobile station, which receives a base transceiver station's transmission on the broadcast control channel, the location area in which it is located at that moment. If a mobile station detects in conjunction with a handover or cell reselection that the base station's location area identity has changed, it sends a location update request to the network.

While moving in the area of a mobile network a mobile station normally listens to the base station having the strongest signal. Thus, as a mobile-terminated or mobile-originated connection is to be set up, it is first attempted to use that base station. If that base station cannot provide a traffic channel for the connection, the mobile station tries to set up the connection via the base station offering the next strongest signal. If, during the connection established, the mobile station moves within the operating areas of more than one base station, handovers are carried out during the connection according to the principle described above.

FIG. 2a in the drawing attached hereto shows signalling in GSM between a mobile network and mobile station in mobile-originated call setup. When a mobile station wants to set up a connection, it sends to the network a Channel_Request (message 21) to which the network responds with an Immediate_assignment message 22 by means of which it assigns a standalone dedicated control channel SDCCH to the mobile station MS for signalling purposes. The mobile station MS sends on the signalling channel assigned a CM_service_request message 23, indicating the type of the service requested, in this case a call setup on a traffic channel. Subscriber authentication is carried out using an Authentication_request message 24 and Authentication_response message 25. In the authentication, information stored in the network is compared with information stored in the mobile station MS with the aim of controlling access to the network, among other things, in order to prevent different violations.

After successful authentication a Cipher_mode_command message 26 and Cipher_mode_complete message 27 carry information about the protection algorithm used on the connection. A Setup message and Call_proceeding message 29 carry more detailed information about the connection to be established. Such information includes e.g. the called number transmitted from the mobile station to the network. Then the network assigns a traffic channel to the mobile station using an Assignment_command message 30, acknowledged by the mobile station MS with an Assignment_complete message 31. In step 32 ringing tone is transmitted to the mobile station MS and when subscriber B has answered, the call is established using the Connect 33 and Connect_acknowledge 34 messages. The call then proceeds on the traffic channel as usual.

In a like manner FIG. 2b in the drawing attached hereto shows the call setup signalling in GSM in the case of a mobile-terminated connection. Like messages in FIGS. 2a and 2b have like reference designators. The network pages a mobile station MS using a Paging_request message 35 to which the mobile station responds by sending to the network a Channel_request (message 21) for a signalling channel. The network assigns to the mobile station MS a signalling channel using an Immediate_assignment message 22 as described above. The mobile station MS responds to the paging message on the signalling channel assigned to it using a Paging_response message 36. Messages 24 to 27 are used for subscriber authentication and for transmitting the protection algorithm data in the manner described above. Call setup is initialised in the Setup message 37 and Call_confirmed message 38, and a traffic channel for the call is assigned to the mobile station MS in the Assignment_command 30 and Assignment_complete 31 messages. In step 39 the mobile station MS indicates that it is alerting and when the mobile subscriber has answered, the call is established using the Connect 40 and Connect_acknowledge 41 messages. The call then proceeds on the traffic channel as usual.

In cellular-type mobile communication systems radio coverage is achieved using several slightly overlapping radio cells. As a mobile station moves from a cell to another, a handover is carried out in accordance with predetermined handover criteria. The handover should as little as possible disturb the existing connection. Normally, a handover is based on radio path criteria but it may be carried out for other reasons, too; in order to distribute load or reduce transmission power, for instance. A handover may also be carried out within a cell, between traffic channels.

A neighbour cell priority list may also be specified for a base transceiver station BTS so that one or some of the neighbour cells of the base transceiver station are defined as primary handover target cells. In a handover situation, the connection is then handed over to one of these priority cells always when possible. The neighbour cell priority list is base transceiver station specific, and all mobile stations perform the handover in the same manner because of the list.

A mobile station MS continuously measures the signals of the base transceiver stations BTS closest to the cell in which it is located e.g. to determine the base transceiver station that offers the best signal, and in order to prepare for a possible handover. On the basis of the neighbour cell information transmitted by each base transceiver station on its broadcast control channel the mobile station recognises the neighbour cells that it should monitor. For example, in GSM a mobile station MS may measure the signal level and quality of the serving base transceiver station and simultaneously the signal levels of 32 other base transceiver stations at the most. The mobile station MS regularly sends the measurement results in the form of a report message via the serving base transceiver station BTS1 to a base station controller BSC. The report message contains the measurement results for the serving base transceiver station and six best neighbour base transceiver stations at the most. A handover between the serving cell and a neighbour cell or between channels of the serving cell may occur e.g. when the measurement results of the mobile station and/or base transceiver station indicate a low signal level and/or quality for the channel of the current serving cell and a neighbour cell offers a better signal level or another channel offers a better signal quality or when a neighbour cell/another channel offers a chance to use lower transmission power. The selection of the handover target cell is based e.g. on the signal level and/or load of the target cell. So, commonly used handover criteria include, among others, the signal level and quality of the radio path, signal levels of the source cell and target cell, signal quality of the source cell, and the transmission power which is on the one hand required of and on the other hand allowed for the mobile station in the target cell. A handover between traffic channels or signalling channels is usually carried out once the handover criteria set by the operator are met. A handover may also occur because of an overload. A so-called directed retry is also considered a handover when in the setup phase the traffic channel is chosen from a cell different from that in which signalling was carried out.

FIG. 3 in the drawing attached hereto shows signalling in a handover between two base station systems BSS in a GSM network. In FIG. 3, a radio connection has been established to a mobile station MS, e.g. in order to transmit speech, data or signalling, via a base transceiver station BTS1 and base station controller BSC1 (not shown) in a base station system BSS1. The base station controller BSC1 receives measurement results from measurements by the base transceiver station BTS1 and mobile station MS and, if necessary, hands the connection over from the base transceiver station BTS1 to another base transceiver station under its management, for example. When the base station system BSS1 detects that the connection should be handed over to a base transceiver station in another base station system it sends to the mobile services switching centre MSC a handover request in a Handover_required message 1, indicating also the reason for the handover, e.g. the quality of the radio link or the signal level, as well as the identity/identities of the handover target cell. The mobile services switching centre MSC sends to the base station system of the target cell, in the case depicted by FIG. 3, the base station system BSS2, a Handover_request message 2, indicating that the radio connection of the mobile station MS is handed over to the base station system BSS2. The base station system BSS2 responds to the mobile services switching centre MSC using a Handover_request_acknowledge message 3, indicating the new radio channel assigned to the mobile station MS. In a Handover_command message 4 the mobile services switching centre MSC sends to the base station system BSS1 radio channel information which the base station system BSS1 further sends to the mobile station MS in a Handover_command (message 5). The mobile station MS performs the handover by adopting the new assigned radio channel and acknowledges the base station system BSS2 of a successful handover with a Handover_complete message 6. The base station system BSS2 further informs the mobile services switching centre MSC about the successful handover using a Handover_complete message 7. From then on the traffic to and from the mobile station MS flows via a base transceiver station and base station controller in the base station system BSS2.

For a mobile subscriber to be able to use cell-specific services in an area specified for the subscriber the setup and handover methods have to allow for the direction of the mobile station to the special cells in mobile networks offering tailored special services. Then the base station controller must know the special cells of the mobile subscriber. This information is advantageously stored in the home location register HLR or in a database of an intelligent network wherefrom it could be transferred to the base station controller during call setup and in conjunction with a handover when moving into the coverage area of a new base station controller. This, however, involves the problem that the transfer of the special cell information from the home location register would result in an unreasonably long delay in the call setup/handover.

A solution is applicable to this problem which according to the information available to the applicant has not been disclosed in public at the moment of filing the present application. The solution is based on the idea that base station selection is carried out on the basis of a special cell list created for the mobile station and stored on the mobile station. When a base station controller controls the base station selection the mobile subscriber's special cell list is sent from the mobile station to the base station controller in connection with a call setup and, if necessary, in connection with the execution of a handover. An attempt is made to direct the mobile station to its special service area in call setup and handover. By means of the special cell list the cells in the network can be divided, as far as a single mobile station is concerned, into special cells, such as primary cells, for example, and normal cells. In call setup the mobile station is assigned a traffic channel of a base station of a primary cell specified for the mobile station when the mobile station is located in the area of such a primary cell. A base station of a primary cell specified for the mobile station is selected as the handover target cell when the signal of the primary cell base station is suitable for handover. This is realised e.g. by setting a handover criterion that the base station signal of a cell defined as primary in the special cell list must meet in order for the handover to be carried out from a normal cell of the network to a primary cell of the mobile station. By means of such base station selection carried out in handover and call setup the mobile station is directed to the special service and kept in the special service area when it is reasonable from a radio standpoint.

The problem with the solution described above is that special cell information, especially the special cell identities, contains rather a big amount of data so that the transfer of special cell information from a mobile station to a base station system uses an unreasonably big portion of the radio path's signalling capacity.

SUMMARY OF INVENTION

An object of the invention is to provide a solution for the transfer of special cell information from a mobile station to a base station system in such a manner that mobile subscriber specific special cell services can be realised with short delays in the transfer of special cell information and with a light network load.

An idea of the invention is that special cell identities are transferred from a mobile station to a base station system encoded in such a manner that the transfer of special cell identity information requires fewer bits than what would be needed for the transfer of special cell identities as such. Cell identities are advantageously chosen such that the cell identities of a single area can be coded with a low number of bits.

In accordance with the principle according to the invention the transfer of special cell identities can be advantageously performed in such a manner that the first special cell identity is transferred as such and after that it is transferred transfer codes that are differences of two consecutive special cell identities in the special cell list. Then the special cell identities are advantageously arranged in the order of magnitude in the special cell list.

In most cases the solution according to the invention makes it possible to transfer the special cell information on the radio path using a single L2-frame-size message so that the transfer of special cell information can be carried out quickly without using a lot of the radio path's capacity in connection with call setup and handover.

The method according to the invention for transferring special cell information in a cellular system from a mobile station to a base station system, wherein said special cell information comprises a list of special cell identities (CI), is characterised in that

- a transfer code is determined on the basis of at least two special cell identities,
- said transfer code is transferred from the mobile station to the base station system and
- the special cell is identified on the basis of the transfer code transferred.

The cellular system according to the invention which comprises means for selecting the serving base station on the basis of a special cell list is characterised in that it comprises means for transferring special cell information from a mobile station to a base station system using a transfer code which is created on the basis of at least two special cell identities and the bit number of which is smaller than the bit number of a single special cell identity.

The mobile station according to the invention is characterised in that it comprises means for storing special cell information, means for creating a transfer code on the basis of at least two special cell identities the bit number of which is smaller than the bit number of a single special cell identity, and means for sending the transfer code to a base station system.

Preferred embodiments of the invention are described in the sub-claims.

BRIEF DESCRIPTION OF DRAWINGS

The invention is below described in more detail with reference to the accompanying drawing wherein

FIG. 2a illustrates prior-art call setup in the form of a signalling diagram for a mobile-originated connection;

DETAILED DESCRIPTION

Figure 1:
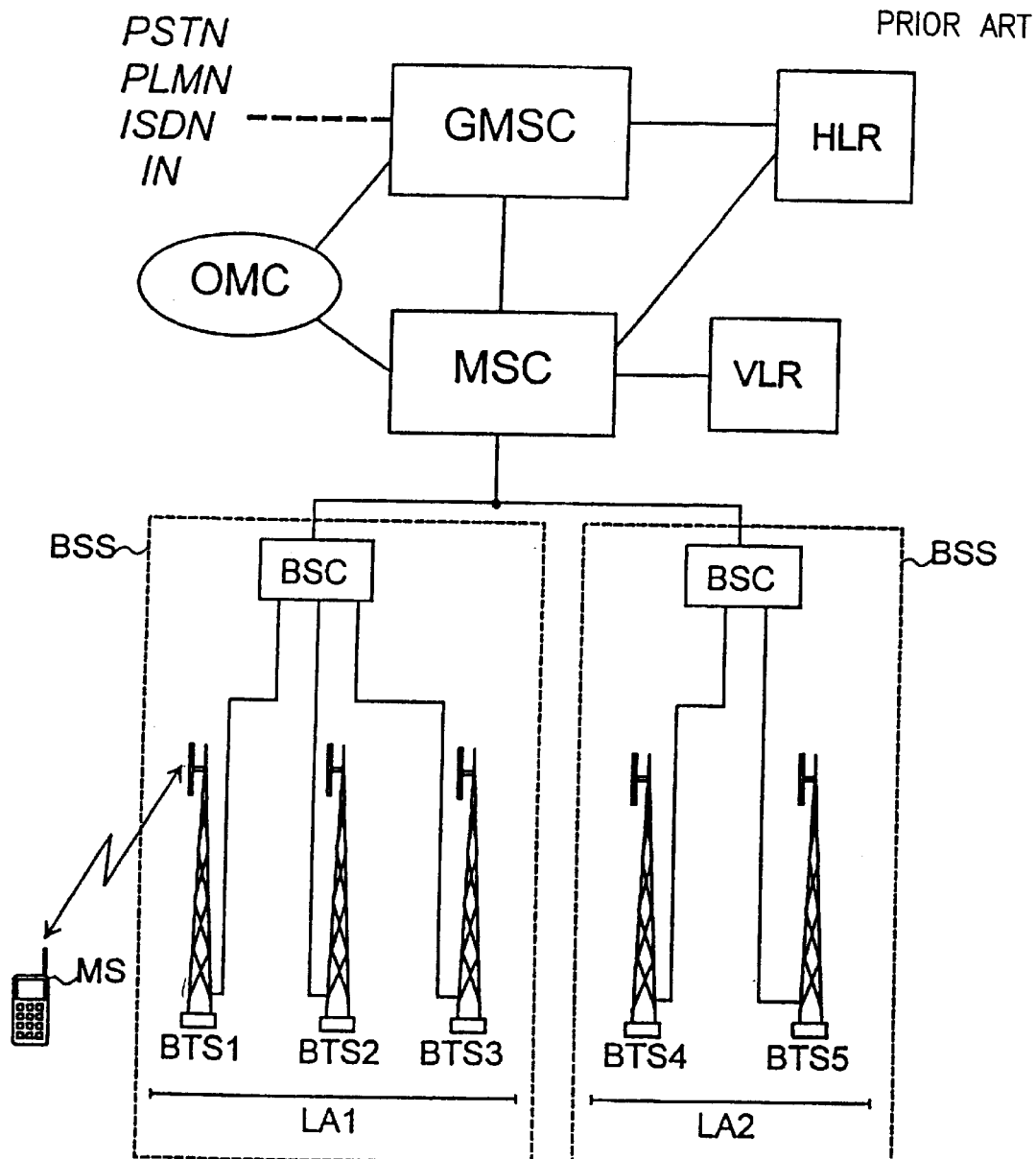
FIG. 1 shows a mobile network according to the prior art.
Figure 2B:
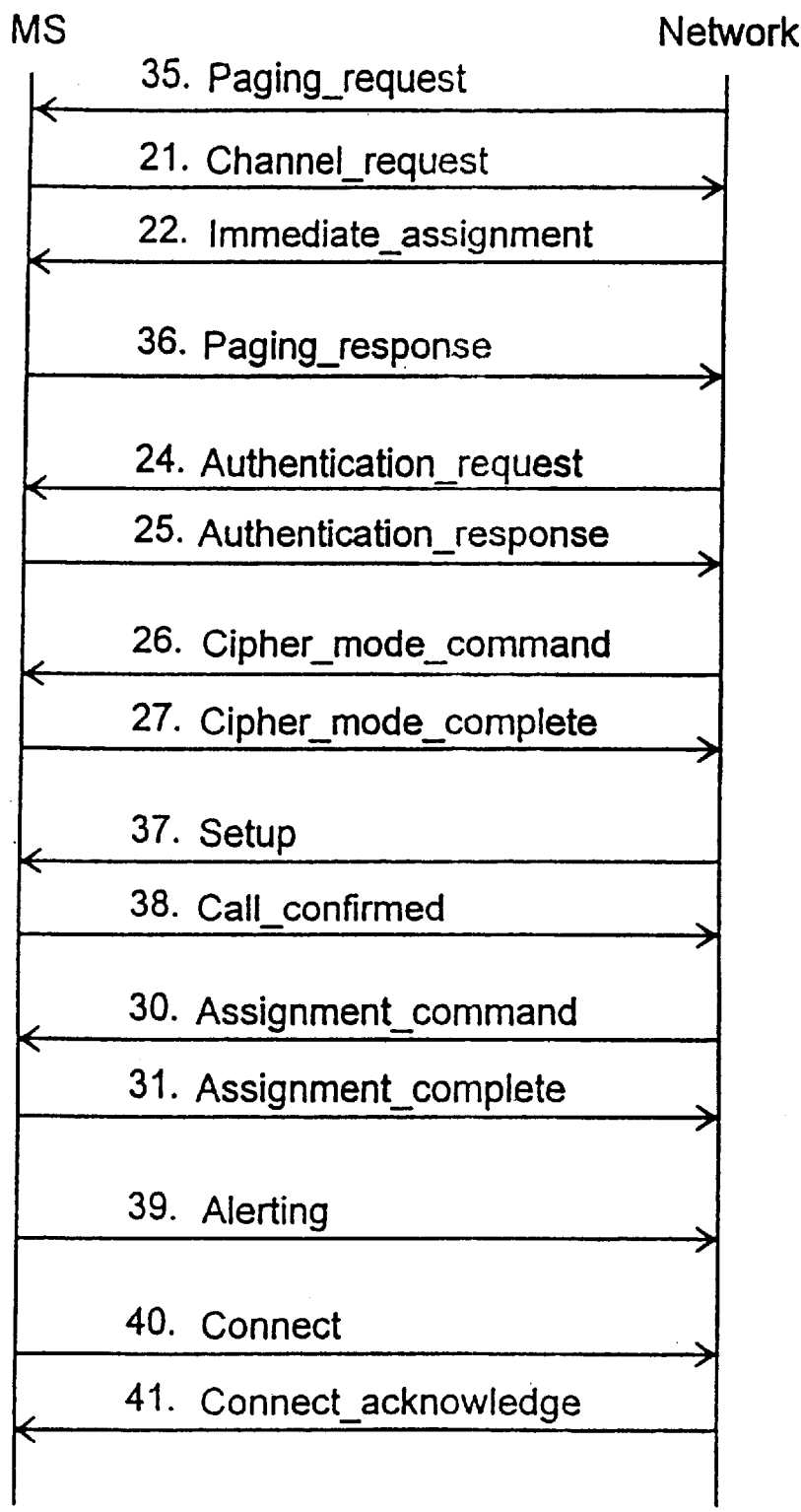
FIG. 2b illustrates prior-art call setup in the form of a signalling diagram for a mobile-terminated connection.
Figure 3:
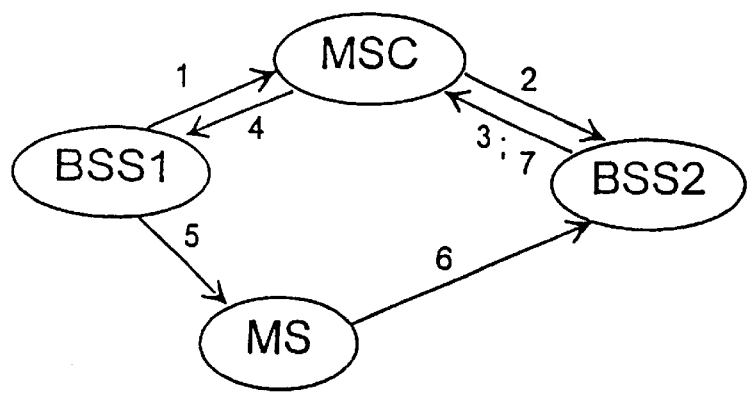
FIG. 3 shows messages exchanged between the different network elements in a handover.

FIGS. 1 to 3 were already discussed in connection with the description of the prior art.

Figure 4:
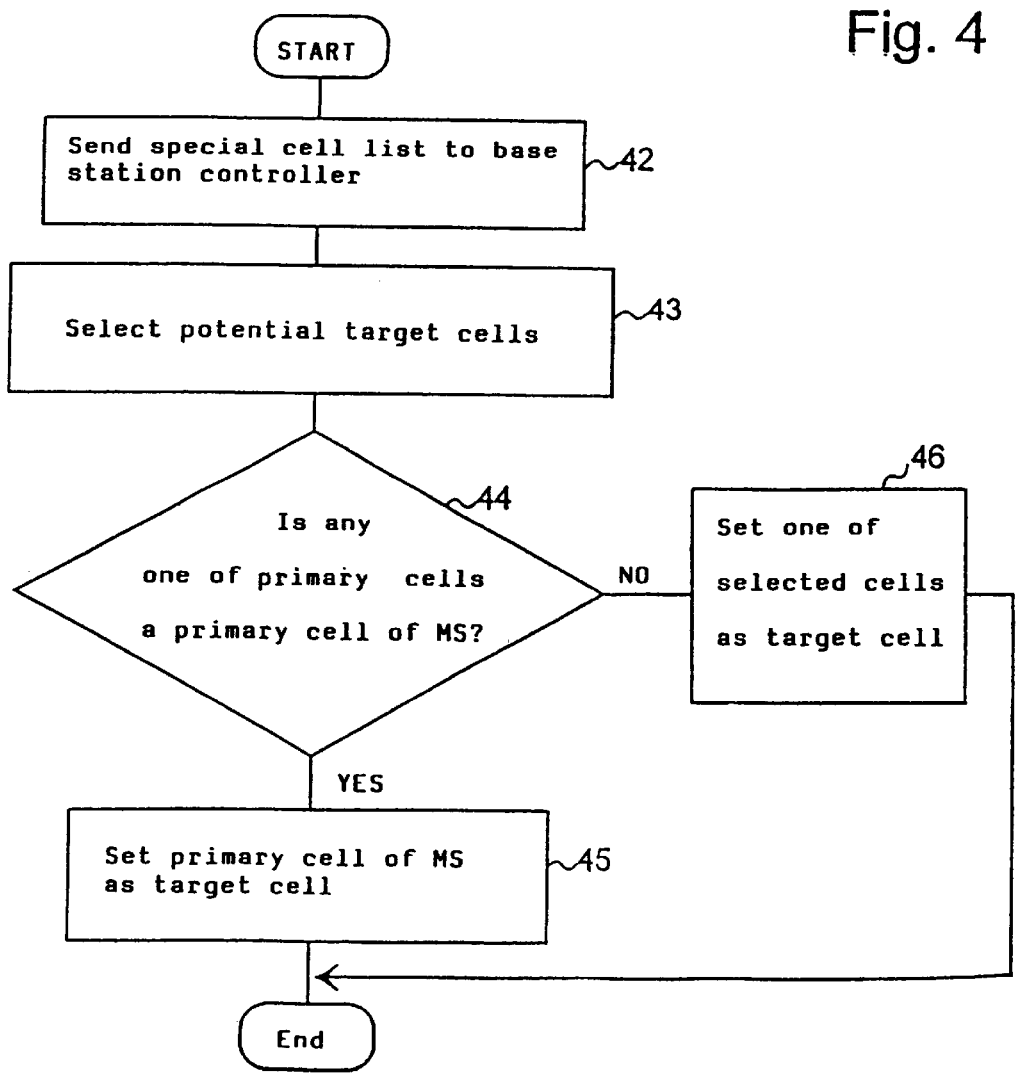
FIG. 4 shows in the form of a flow diagram a method according to the invention for selecting the serving cell.

FIG. 4 shows a flow diagram of a method according to the invention for a mobile station for selecting the serving cell on the basis of a special cell list. First, special cell information is transferred from a mobile station to a base station system, step 42, in accordance with the invention. The special cell information may also include priority level information, i.e. the mutual selection priority between the special cells. The special cell information is transferred in conjunction with call setup or handover. After that, target cells are selected in step 43. This is done e.g. on the basis of predetermined radio path quality criteria. Then it is checked in step 44 whether any one of the selected cells is a primary cell of the mobile station MS, i.e. included in the special cell list. If there is among the selected cells one primary cell, that one is selected as the target cell, i.e. the new serving cell. If there are among the selected cells two or more cells that belong to the special cell list, the cell having the highest special cell priority is selected, assuming that mutual priorities have been specified for the special cells. If no mutual priorities have been specified, the target cell can be selected from among the special cells using the same criteria that are used when selecting a target cell from among several cells meeting the quality criteria. If there are among the selected cells no cell that belongs to the special cell list, i.e. a primary cell, the target cell is selected from among cells outside the special cell list, which means that services associated with the special cell list will not be available after the cell change.

Figure 5:
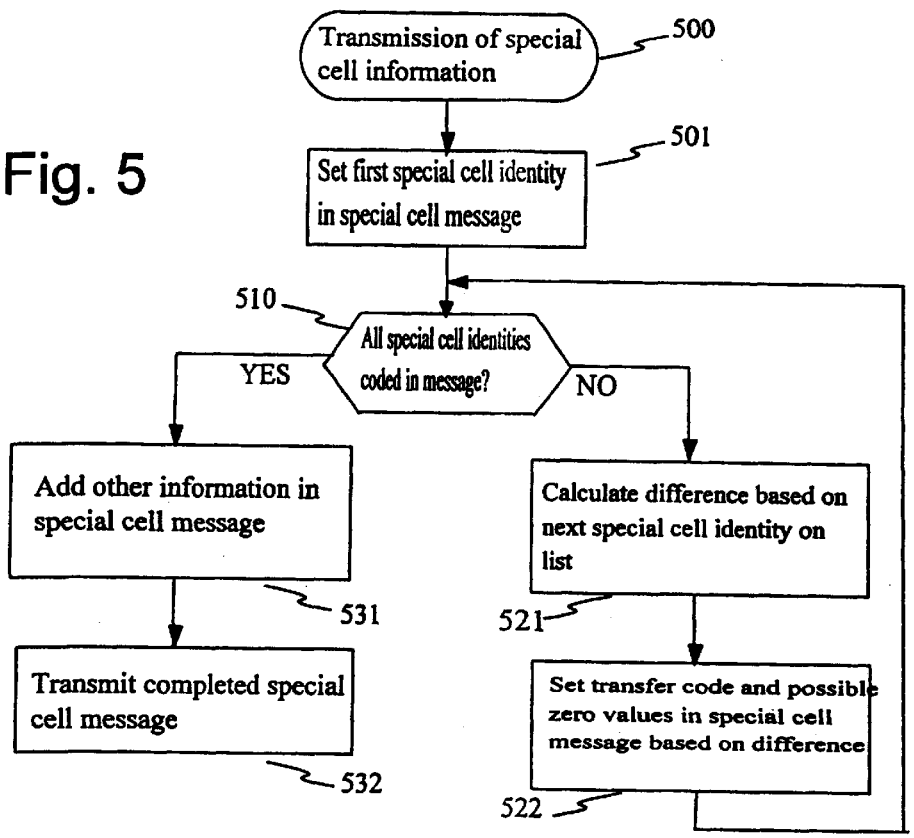
FIG. 5 shows in the form of a flow diagram a method according to the invention for transmitting special cell information.

Next it will be considered by means of FIG. 5 in closer detail the transmission 500 of special cell information, which in the handover procedure depicted by FIG. 4 was included in step 42. A special cell message is created on a mobile station containing the necessary special cell information, and said message is transmitted to a base station system. According to the invention, the special cell message is preferably created in such a manner that the cell identity CI1 of the first cell in the special cell list is taken in the message as such, step 501.

Then it is checked whether there are other cells in the special cell list, step 502. If there are other cells in the list, it is calculated the value of the difference, delta1, of the second cell identity CI2 and first cell identity CI1 in the special cell list, step 521, which is used to create a transfer code in the special cell message. The transfer code advantageously has a predetermined length, say, 2 bits. If the value of the difference is smaller than or equal to the maximum length of the transfer code, the transfer code is set at the value of the difference, step 522. If the value of the difference is greater than the transfer code's maximum value, one or more zero values are created in the special cell message with the interpretation that each zero value increments the value of the difference represented by the transfer code to be transmitted by a value that equals the maximum transfer code value plus one. For the length of the special cell message to be as short as possible, it is advantageous to create the special cell list such that the cell identities are in the ascending order on the list. Furthermore, it is advantageous to assign identities to the cells in such a manner that the identities of cells within a single area are close to each other in magnitude.

After step 522 it is again checked whether all cell identities in the special cell list have been encoded in the message, step 510. If there are cell identities still unencoded, a new transfer code is created on the basis of the difference, delta2, delta3, . . . , of the next cell identity and the previously encoded cell identity in the manner described above. This coding procedure is continued until all cell identities CI1, CI2, CI3, CI4, . . . in the special cell list have been encoded in the special cell message. After that, other information, such as the message type, message length and local area codes LAC for those special cells that belong to the current local service area, are added to the special cell message, step 531. Finally, the message created is sent to the base station system, step 532.

In connection with call setup the transmission of a special cell message is carried out advantageously just before message 24 Authentication_request (FIGS. 2a and 2b). In connection with a handover the transmission of a special cell message is advantageously carried out by including it in the Handover_complete message 6 (FIG. 3).

Figure 6:
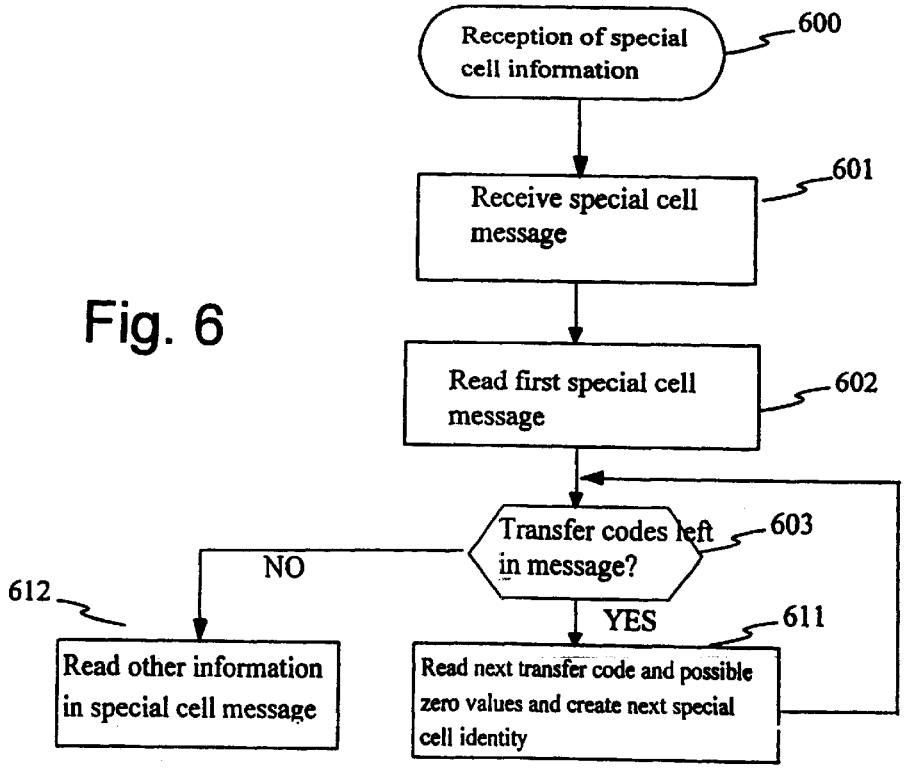
FIG. 6 shows in the form of a flow diagram a method according to the invention for receiving special cell information.

FIG. 6 shows a flow diagram of a method according to the invention for receiving special cell information in a base station system, 600. First, a special cell message is received, step 601, whereafter the first cell identity in the special cell list is read from the special cell message, step 602. Then it is checked whether there are any transfer codes in the message, step 603. If there is a transfer code in the message, it is read, at the same time reading the zero values associated with the transfer code in question, and a new cell identity in the special cell list is created on the basis of the zero values and the previous cell identity, step 611. It is taken into account that a zero value corresponds to the maximum transfer code value plus one. Steps 603 and 611 are then repeated until all the transfer codes have been read, whereafter the other information in the special cell message is read, step 612.

According to a preferred embodiment the length of the transfer code is determined in a special field, so-called specification field, in the special cell message. Then the length of the transfer code can be set separately for each message. This means that from a received special cell message it is first read the specification field indicating the length of the transfer code, and the transfer codes are read only after that.

The specification field indicating the length of the transfer code may also use a special code, advantageously a zero value, to indicate a special characteristic of the field following the specification field. Advantageously such a special characteristic may be that the field following the specification field gives the number of the special cells in the special cell list the special cell identity values of which immediately follow the first special cell identity in the list. The advantage of this arrangement is that the identities the values of which immediately follow the first special cell identity in the list need not be indicated using transfer codes.

Figure 7:
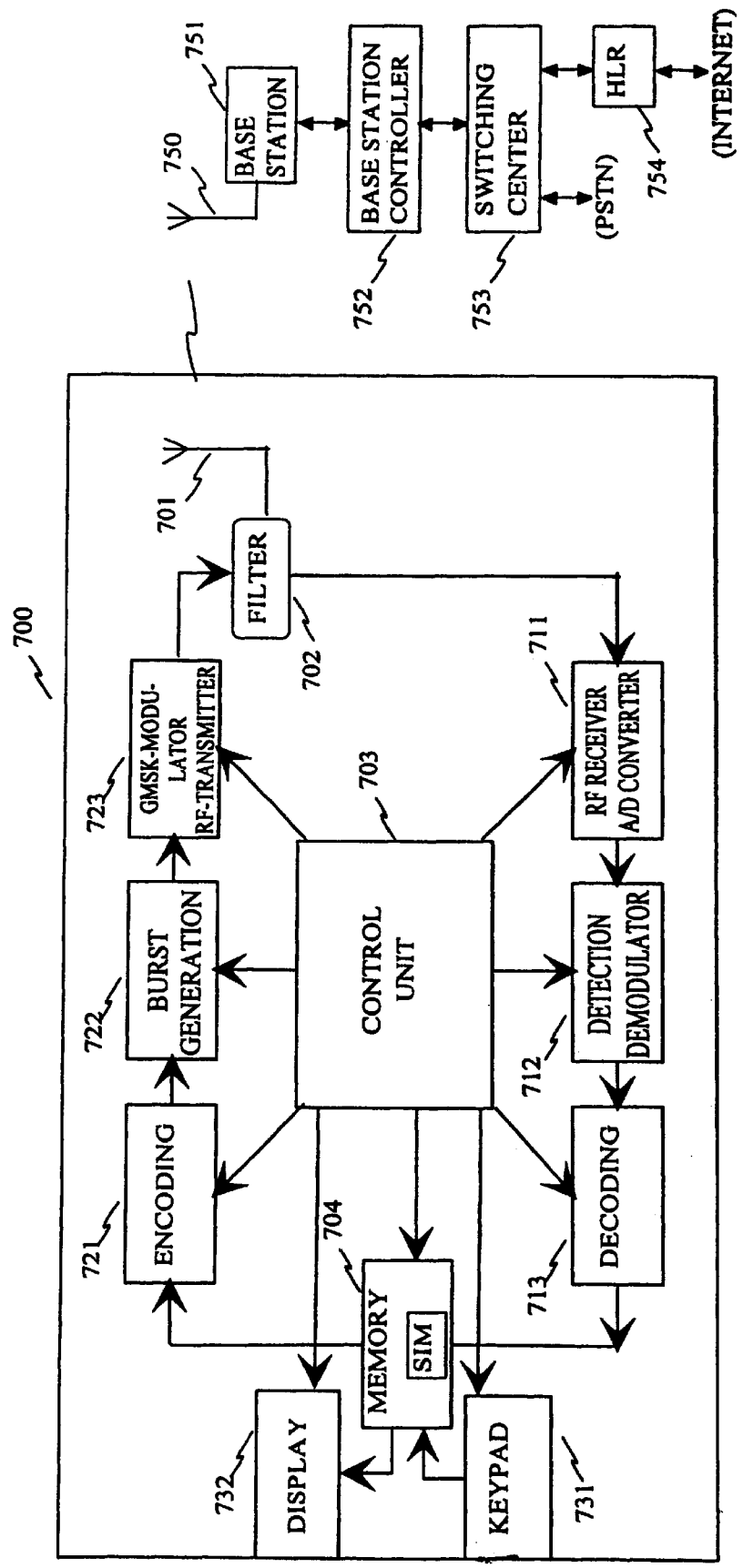
FIG. 7 shows in the form of a block diagram a mobile station according to the invention and how it is connected with a cellular system according to the invention.

FIG. 7 shows a simplified block diagram of a mobile station 700 according to the invention and how it is connected with a cellular system. FIG. 7 mainly shows mobile station parts that are essential to the application of the invention. The mobile station comprises an antenna 701 for receiving a radio-frequency, or RF, signal transmitted by a base station. The received RF signal is directed by means of a duplex filter, for example, to a RF receiver 711 where the signal is amplified and converted digital. Then the signal is detected and demodulated, block 712, as well as decoded in block 713 where the special cell information transferred from the system and the serving cell information are also read. After that, the special cell information included in the received and decoded message are stored in the mobile station's memory 704, advantageously in the SIM (Subscriber Identity Module) memory. The reception and processing functions mentioned above are controlled by a control unit 703.

Having received from the cellular system the serving cell information in connection with call setup the mobile station compares it in the control unit with the special cell list stored in the memory and if the serving cell is a special cell the mobile station sends the special cell information to the base station system. The transmission of the special cell information from the mobile station according to the invention is performed e.g. in such a manner that the control unit 703 uses the special cell information to create the transfer codes in accordance with the invention, whereafter the message is coded in block 721 according to the system. The encoded data are arranged in bursts, block 722, which are modulated into a RF signal in block 723. The RF signal to be transmitted is taken to the antenna 701 e.g. via a duplex filter 702. The processing and transmission functions mentioned above are controlled by a control unit 703.

The blocks of the mobile station according to the invention can be formed using known components. However, the control unit controlling the other blocks executes the block control functions according to special software, thus producing the above-mentioned block functions according to the invention.

FIG. 7 also shows the different elements of a cellular system according to the invention. Transmission and reception of a RF signal is carried out by means of an antenna 750 in a base station 751. Special cell information received from a mobile station is transferred from the base station 751 further to a base station controller 752. In conjunction with a handover between base station systems the special cell information can be sent to the new base station controller via a switching centre 753. Apart from other base station systems the switching centre 753 is connected with a home location register 754 and public switched telephone network PSTN, among other things. The home location register 754 may be connected with the Internet which can be used in additional services of the system.

In a cellular system the reception and decoding of messages containing special cell information are carried out using the same means as in a mobile station.

Above it was disclosed some embodiments of the method according to the invention. The principle according to the invention may naturally be modified within the scope of the invention defined by the claims set forth below as regards e.g. the details of implementation and the range of application.

Although it was above described the application of the invention in a GSM system, the invention can be applied in other cellular systems as well, such as CDMA-type systems, for instance. The embodiments described above involve so-called second-generation cellular systems, where like base stations are controlled by like base station controllers, but the invention is easily applicable to so-called third-generation cellular systems where the capabilities and services of base station controllers and base stations vary considerably.

Instead of the cell identity CI the cell identification code stored in the special cell list may be almost any unequivocal identifier by which a cell in the network can be identified, e.g. the cell global identification CGI code, which according to GSM recommendations is formed as a combination of the country code, network code, location area and cell identity information.

In the embodiments discussed above the transfer code was formed using the difference of two consecutive special cell identities. However, it should be noted that other alternative coding methods can be used, by means of which the information identifying the special cells can be transferred using fewer bits.

What is claimed is:

1. A method for transferring special cell information in a cellular system from a mobile station to a base station system so that said special cell information comprises a first special cell identity and a second special cell identity, and a transfer code is created which is transferred from the mobile station to the base station system (532) and the second special cell corresponding to the second special cell identity is identified on the basis of a transfer code (611), characterised in that the said transfer code is created based on at least the first and second special cell identity (521, 522) in such a way that the length of the said transfer code is shorter than the length of the second special cell identity.

2. The method of claim 1, characterised in that said special cell information is transferred in order to control the selection of active base station.

3. The metod of claim 1, characterised in that said cellular system substantially is a GSM system.

4. The method of claim 1, characterised in that the transfer of information of two special cells comprises the following steps:
   a first special cell identity is transferred (501, 602),
   a transfer code is defined as the difference of a second special cell identity and first special cell identity (521, 522),
   the transfer code thus created is transferred (602) and
   the sum of the first special cell identity transferred and the transfer code transferred is calculated in order to create a second special cell identity (611).

5. The method of claim 4, characterised in that a data field of a predetermined length is reserved for the transfer code to be transferred.

6. The method of claim 5, characterised in that when the value of the difference exceeds the predetermined data field length, one or more zero values are transmitted (522) so that each zero value is considered to increment the value of the difference represented by the transfer code by an amount which equals the maximum transfer code value plus one.

7. The method of claim 1, characterised in that a special cell message is transferred from a mobile station to a base station system, said message containing at least the following information:
   message type,
   message length,
   the first cell identity (CI1) in the special cell list,
   transfer codes corresponding to the next cell identities (CI2, CI3, . . . ) in the special cell list, and
   local area codes (LAC) of the special cells (CI) that belong to the current local service area (LSA).

8. The method of claim 7, characterised in that the special cell message comprises a specification field indicating the length of the transfer code.

9. The method of claim 8, characterised in that said specification field may adopt a special value so that the field after said specification field indicates the number of the special cell identities the values of which immediately follow the value of the first special cell identity in the special cell list.

10. The method of claim 7, characterised in that the special cell message is transferred in conjunction with call setup or in a message transferred in connection with a handover.

11. A cellular system comprising means for selecting a serving base station on the basis of a special cell list which said cellular system comprises means (701–704, 721–723, 750–752) for transferring special cell information from a mobile station to a base station system where upon the said special cell information comprises at least a first special cell identity and a second special cell identity and means for identifying the second special cell corresponding to the second special cell identity on the basis of a transfer code, characterised in that said cellular system comprises means for creating the said transfer code at least on the basis of the said first special cell identity and on the said second special cell identity so that the length of the said transfer code is shorter than the length of the second special cell identity.

12. The cellular system of claim 11, characterised in that said cellular system substantially is a GSM system.

13. A mobile station (700) connected with a cellular system comprising means (704) for storing and sending special cell information to the base station system where the said special cell information comprises a first special cell identity and a second special cell identity and means for creating and sending a transfer code to the base station system for identifying the second special cell corresponding to the second special cell identity, characterised in that the mobile station also comprises means for creating the said transfer code on the basis of the said first and second special cell identity so that the length of the said transfer code is shorter than the length of the second special cell identity.

14. The mobile station of claim 13, characterised in that said cellular system substantially is a GSM system.

* * * * *